US008937541B2

(12) United States Patent
Schaal

(10) Patent No.: US 8,937,541 B2
(45) Date of Patent: Jan. 20, 2015

(54) ANTI-THEFT DEVICE FOR A MUSICAL INSTRUMENT

(71) Applicant: Michael John Schaal, Seattle, WA (US)

(72) Inventor: Michael John Schaal, Seattle, WA (US)

( * ) Notice: Subject to any disclaimer, the term of this patent is extended or adjusted under 35 U.S.C. 154(b) by 0 days.

(21) Appl. No.: 13/766,608

(22) Filed: Feb. 13, 2013

(65) Prior Publication Data

US 2014/0225778 A1    Aug. 14, 2014

(51) Int. Cl.
*G08B 1/08* (2006.01)
*G01S 1/04* (2006.01)
*G10G 7/00* (2006.01)

(52) U.S. Cl.
CPC .. *G01S 1/042* (2013.01); *G10G 7/00* (2013.01)
USPC ............ 340/539.11; 340/539.13; 340/539.22; 340/5.22; 340/572.1; 340/572.7; 84/723; 84/724; 84/737; 84/646

(58) Field of Classification Search
CPC .................................. G01D 3/12; G10H 1/342
USPC ................. 340/539.11, 539.13, 539.22, 5.52, 340/572.1–572.8; 84/723, 724, 737, 646
See application file for complete search history.

(56) References Cited

U.S. PATENT DOCUMENTS

| 7,906,720 | B2* | 3/2011 | Delorme | 84/477 R |
| 8,173,887 | B2* | 5/2012 | Sullivan | 84/724 |
| 2007/0000375 | A1* | 1/2007 | Harrison, Jr. | 84/737 |
| 2008/0030345 | A1* | 2/2008 | Austin et al. | 340/572.8 |

\* cited by examiner

*Primary Examiner* — Tai T Nguyen
(74) *Attorney, Agent, or Firm* — Seed IP Law Group PLLC

(57) ABSTRACT

A musical instrument location transmitting device and system includes a musical instrument having a location transmitting device and an electric power source permanently secured in the musical instrument in a position that requires removal of a musical component of the musical instrument in order to remove the location transmitting device. The location transmitting device includes a location sensing unit and a wireless transmitter that outputs a location of the musical instrument. A system wirelessly monitors a location of the musical instruments. A method of making a musical instrument includes coupling a location transmitting device inside a musical instrument and closing the musical instrument to permanently install the location transmitting device.

20 Claims, 5 Drawing Sheets

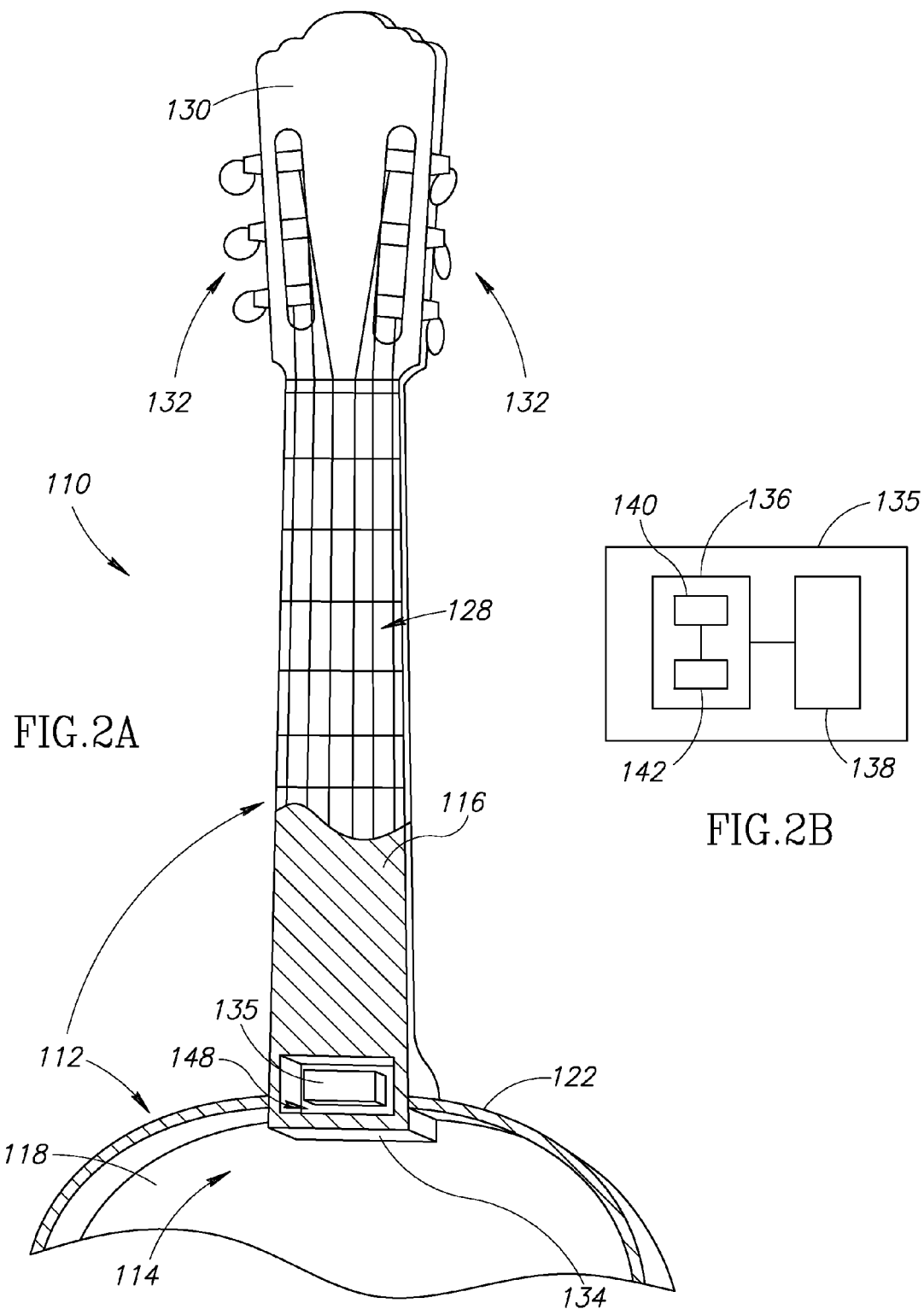

ANTI-THEFT DEVICE FOR A MUSICAL INSTRUMENT

BACKGROUND

1. Technical Field

The present disclosure pertains to musical instruments, and more particularly, to musical instruments having devices to monitor and locate the musical instruments.

2. Description of the Related Art

Every year over 1 million instruments are stolen from musicians and less than 3% are recovered. Even though many stolen musical instruments are unique and identifiable by some aspects, nearly all are unrecovered by the true owners. This is partially because of the ease of concealing and transporting certain musical instruments, such as guitars, violins, and the like. Furthermore, many musical instruments are very valuable, making them more prone to theft than less expensive and less available merchandise. Some collectible guitars have been sold for millions of dollars. For example, "The Strat" generated a total of 3.7 million dollars at auction. As another example, some violins have been sold for millions of dollars. The "Vieuxtemps Guarneri" sold for 18 million dollars, making it the most expensive violin in the world. Thus, some musical instruments are akin to rare art, having a constant risk of theft, except that many common musical instruments look alike and are difficult to track, which poses an even higher risk of theft because of resellability.

Once a musical instrument is stolen, it can easily and quickly be sold on the black market, to pawn shops, or through online sales and auctions. Thus, the stolen musical instrument can pass through many purchasers in a relatively short timeframe, which causes greater difficulties for the owner and authorities in finding and recovering the instrument. In many instances, a thief or purchaser of a stolen instrument will use and keep the instrument indoors and never reveal it to the public, which makes ever recovering the stolen item almost impossible. In contrast, stolen vehicles are much more visible and traceable than a stolen musical instrument because a stolen vehicle is very difficult to conceal and sell; even the parts are difficult to sell because of enhanced security measures. Such is not the case with musical instruments. Millions are stolen and few are recovered.

BRIEF SUMMARY

According to one aspect of the present disclosure, a musical instrument includes a location transmitting device permanently secured inside the musical instrument. The location transmitting device wirelessly outputs a location of the musical instrument in the event the musical instrument is lost or stolen. In a preferred aspect, the location transmitting device is in a position in the musical instrument that requires removal of a musical component of the musical instrument in order to remove the location transmitting device, thus making it permanent with respect to the musical use of that instrument.

If the would-be thief is unaware of the presence of a location transmitting device in a stolen guitar, the owner and the authorities could simply trace the location of the guitar and repossess it. In any event, the location transmitting device prevents theft of the guitar in the first instance and it provides a mechanism for recovering the guitar if it were indeed stolen.

In the event a would-be thief is aware of the existence of a location transmitting device permanently installed in a musical instrument (such as by an insignia on the outside of the guitar), the thief may be required to permanently destroy the musical instrument in the process of removing the location transmitting device in order to steal the instrument, which thereby renders the musical instrument useless and/or valueless because it would not be playable or resalable. This would defeat the purpose of stealing the musical instrument in the first instance. In some aspects, it is required to destroy a musical component of the musical instrument in order to remove or destroy or otherwise tamper with the location transmitting device. For example, where the location transmitting device is permanently secured inside of a guitar, a thief must remove the top cover and even other musical components of the guitar to access the location transmitting device. The would-be thief must do this quickly in order to "safely" steal the guitar since it must be done before the location transmitting device can output a signal to the owner of the guitar of its current location, after being taken. In any event, whether removing and/or destroying a component of the musical instrument, the particular position of the location transmitting device can prevent (or at least slow down) the thief from stealing the musical instrument.

In some aspects, a location transmitting device is coupled to an electric power source that is also in the musical instrument for powering the location transmitting device. As such, the location transmitting device and the electric power source are permanently secured inside a musical instrument, and may be housed in one unit. The location transmitting device may have a location sensing unit and at least one wireless transmitter. The location sensing unit is capable of determining a location of the musical instrument, and the at least one wireless transmitter will output information pertaining to the musical instrument, including its current location.

In some aspects, a location transmitting device is in a position that does not noticeably interfere with the acoustic properties of the musical instrument. This is a very important aspect to musicians because any interference of the musical properties of a musical instrument, such as a string or wind instrument, can dramatically affect performance of the musical instrument, which is the livelihood for many musicians.

In some aspects, the musical instrument is one of an acoustic guitar, an electric guitar, a hybrid guitar, a string musical instrument, and a wind musical instrument, although a location transmitting device could be permanently installed in other musical instruments, such as percussion instruments.

Throughout this disclosure, it will be appreciated that use of the term "guitar" could be replaced with any musical instrument that is capable of receiving a permanently installed location transmitting device according to the present disclosure, such as other string instruments, brass instruments, percussion instruments, wind instruments, etc.

In aspects of the musical instrument being an acoustic guitar, a location transmitting device may be permanently secured to a proximal end of the neck of the guitar and inside a cavity of the guitar. For example, a location transmitting device may be permanently secured to a neck block in a cavity of a guitar, or even inside of a formed cavity in the neck itself.

In aspects of the musical instrument being an electric or hybrid-electric guitar, a location transmitting device may be permanently secured to a cavity underneath the electrical pickup of the guitar. Thus, the location transmitting device would be in a position that requires removal of the pickup (and perhaps even the strings) in order to remove or tamper with the location transmitting device. When the location transmitting device is mounted under the pickup of an electric guitar, the battery can be of the rechargeable type. Each time the guitar is plugged in, the battery will be provided a power source to recharge the battery.

In some aspects, the at least one wireless transmitter may be capable of outputting a wireless signal having information to at least one of a mobile device, computing system, satellite, communication tower, and wireless router. The information may include at least one of a location of the musical instrument, a state of charge of the location transmitting device, a proximity of the musical instrument relative to a location, and data pertaining to a type of musical instrument. Thus, when the musical instrument is stolen or lost, the owner can quickly and readily determine the location of the musical instrument by receiving the output from the location transmitting device delivered to the owner's mobile device, for example. It is common knowledge that the chance of recovering a stolen item drastically reduces with each minute of time that passes after the item is stolen. Thus, being able to immediately determine a location of a stolen musical instrument is key to quickly and safely recovering the stolen item before it is moved and/or before the location transmitting device is destroyed and/or before the location transmitting device depletes the energy from an energy power source inside the guitar. In some aspects, the location transmitting device automatically outputs a signal that the musical instrument has been slightly moved, or removed from proximity to a location or a computing system, thereby alerting the owner that the musical instrument has just been moved and might be about to be stolen.

In some aspects, a system for monitoring musical instruments includes a plurality of musical instruments in proximity to each other at a location. Each musical instrument may have the same or similar features discussed in the present disclosure, particularly with reference to the location transmitting device and energy storage device, which is permanently secured in each guitar. A computing system having a transmitter may be in proximity to the location and the plurality of musical instruments and is in communication with the location transmitting devices of the musical instruments. For example, the computing system may have a wireless router in a home or building, or may even have a Bluetooth device used on location, such as at a concert. The computing system may be capable of receiving and transmitting information obtained from the location transmitting device of each of the plurality of musical instruments to at least determine the location of at least one of the plurality of musical instruments. Accordingly, when one or more musical instruments are removed from a proximity of each other or a proximity of the location, the computing system detects such movement and outputs a signal that a particular musical instrument has been removed from the location. This is particularly advantageous to locations having many musical instruments, such as pawn shops, retail stores, museums, and a collector's home.

A method of making a musical instrument with an anti-theft device includes forming a portion of a musical instrument having an open body having a cavity and a neck. A location transmitting device with an attached power source is put into the neck of the musical instrument. The location transmitting device may also be installed in the open body. The location transmitting device may have a location sensing unit and at least one wireless transmitter that outputs a location of the musical instrument. The open body is then closed to form a closed cavity. Thus, the location transmitting device and the electric power source are permanently secured in the closed body in a position that requires removal of a musical component of the musical instrument in order to remove the location transmitting device.

In aspects of the musical instrument being an acoustic guitar, the open body may be closed with a top portion of the guitar. In some aspects, the location transmitting device is permanently secured in a cavity in the neck. Accordingly, the neck may be milled or formed to have a cavity to receive a location transmitting device, whether before or after the open body is closed.

In some aspects, the method includes installing a power supply line and a power supply port. The power supply line is coupled to the power supply port and the power supply port may be coupled to an exterior portion of the musical instrument. Accordingly, when electrical power is low in the installed battery, an external power source may be coupled to the power supply port to electrically charge the battery. In some aspects, the battery is installed in the musical instrument and has enough charge to last many years such that recharging is not required, which may be achieved by programming the location transmitting device to power on at certain times and intermittently output a signal when moved, thereby reducing the energy requirements for operation of the location transmitting device. In other aspects, electromagnetic induction could be utilized to recharge the electric power source, which obviates the need for power supply lines and ports.

The anti-theft device includes both a location sensing unit and a transmitting unit. Both will consume power, but the transmitting unit will consume more power. If the location sensing unit does not sense a change in location, then there is no need to transmit and power is saved. But if the location sensing unit senses a change in location, it can then output a signal for the transmission unit to output a new signal. If the musical instrument continues to be moved, it will periodically output a signal to direct an owner to its location. Further, the location will be transmitted at least once or twice per day, even if stationary, so that its location can always be tracked and checked at least daily.

BRIEF DESCRIPTION OF THE SEVERAL VIEWS OF THE DRAWINGS

FIG. 2A is a perspective view of an acoustic guitar having a location transmitting device and an electric power source secured in the neck of the guitar according to one aspect of the present disclosure.

FIG. 2B is a schematic view of a location transmitting device and an electric power source of FIG. 2A according to one aspect of the present disclosure.

DETAILED DESCRIPTION

Figures 1A, 1B:
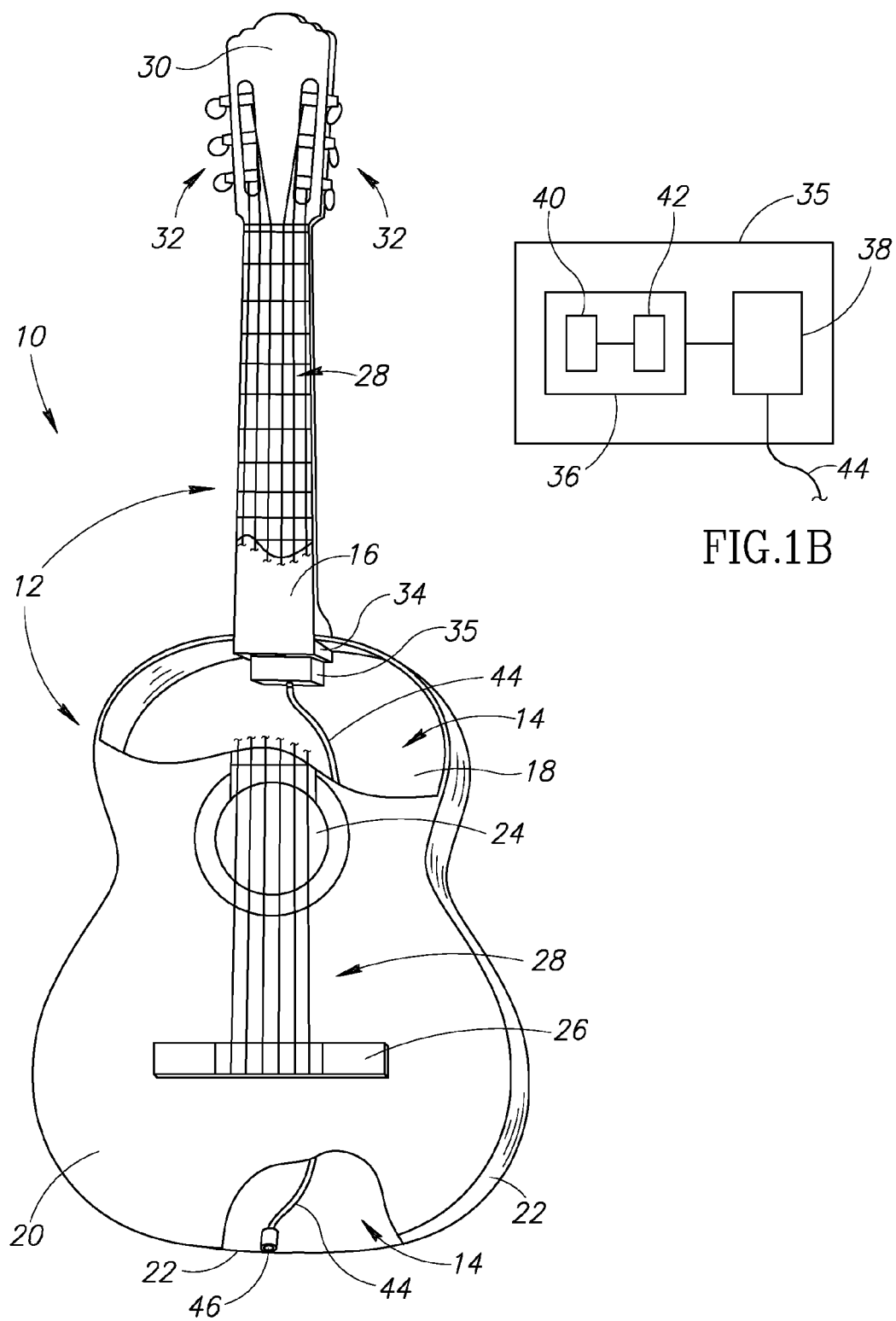
FIG. 1A is a perspective view of an acoustic guitar having a location transmitting device according to one aspect of the present disclosure.
FIG. 1B is a schematic view of a location transmitting device and an electric power source of FIG. 1A according to one aspect of the present disclosure.

FIG. 1A shows a musical instrument 10 according to one aspect of the present disclosure. In this example, the musical instrument is an acoustic guitar 10. The guitar 10 includes a plurality of musical components, such as a body 12 having a cavity 14, a neck 16, a bottom 18, a top 20, sides 22, a sound hole 24, a bridge 26, strings 28, a head 30, tuning keys 32, and a neck block 34 extending partially into the cavity 14. As shown in the cutaway of the guitar 10, a transmitter housing 35 is permanently secured inside the body 12 of the guitar 10. FIG. 1B shows one example of a transmitter housing 35 having a location transmitting device 36 and an electric power source 38 electrically coupled to each other. The location transmitting device 36 may include a location sensing unit 40 and a wireless transmitter 42 electrically coupled to each other. In this example, the transmitter housing 35 is permanently secured to the neck block 34 inside the cavity 14 of the body 12. It will be appreciated that the location transmitting device 36 and the electric power source 38 may be positioned in separate areas inside the guitar 10 and electrically coupled to each other. Accordingly, the location transmitting device 36 is in a position in the guitar 10 that requires removal of a musical component of the musical instrument in order to remove the location transmitting device 36, such as removal and/or destruction of the bottom 18, the top 20, the sides 20, the strings 28, and/or the neck 16. If any of these parts are removed or destroyed, the musical qualities of the instrument are altered or destroyed.

In some aspects, the location sensing unit 40 of the location transmitting device 36 is capable of sensing a location of the guitar 10 and communicating such location to the wireless transmitter 42. Accordingly, the wireless transmitter 42 outputs a location of the guitar 10 in the event the musical instrument is lost or stolen, for example.

In some aspects, the guitar 10 includes a power supply line 44 and a power supply port 46 electrically coupled to each other. The power supply line 44 may be coupled to the electric power source 38 in the transmitter housing 35. The power supply port 46 may be coupled to the side 22 of the guitar 10 and may extend exterior to the side 22 to electrically couple the electric power source 38 to an external electric power source for recharging.

In some aspects, the transmitter housing 35 is positioned at least partially in the guitar 10 in a position that does not noticeably interfere with the acoustic properties of the musical instrument. Accordingly, the transmitter housing 35 may be very small. Furthermore, the transmitter housing 35 may be partially or wholly positioned inside of the neck block 34, or the components inside the transmitter housing 35 may be spatially separated throughout various components inside the guitar 10.

FIG. 2A shows a musical instrument 110 according to one aspect of the present disclosure. In this example, the musical instrument is an acoustic guitar 110. The guitar 110 includes a plurality of musical components, such as a body 112 having a cavity 114, a neck 116, a bottom 118, sides 122, strings 128, a head 130, tuning keys 132, and a neck block 134. As shown in the cross sectional cutaway view of the guitar 110, the neck 116 includes a neck cavity 148 that may be milled or otherwise formed during or after the manufacturing process of the guitar 110, and then may be sealed off from access. The neck cavity 148 includes a transmitter housing 135 permanently installed inside the neck 116 of the guitar 110. Accordingly, after the transmitter housing 135 is installed in the neck cavity 148, manufacturing of the guitar 110 can be completed, thereby sealing the neck cavity 148 indefinitely. Thus, the electric power source 138 is not electrically coupleable to an external power source for recharging. The electric power source 138 may include a sufficient charge that will last for many years, or it may be charged through indirect electrical charging, such as electromagnetic induction.

As shown on FIG. 2B, the transmitter housing 135 includes a location transmitting device 136 and an electric power source 138 electrically coupled to each other. The location transmitting device 136 may include a location sensing unit 140 and a wireless transmitter 142 electrically coupled to each other. Accordingly, the location transmitting device 136 is in a position in the guitar 110 that requires removal and/or destruction of a musical component of the guitar 110 in order to remove the location transmitting device 136 from the neck cavity 148, or otherwise tamper with the device 136.

In some aspects, the location sensing unit 140 of the location transmitting device 136 is capable of sensing a location of the guitar 110 and communicating such location to the wireless transmitter 142. Accordingly, the wireless transmitter 142 outputs a location of the guitar 110 in the event the musical instrument is lost or stolen, for example.

Figure 3A:
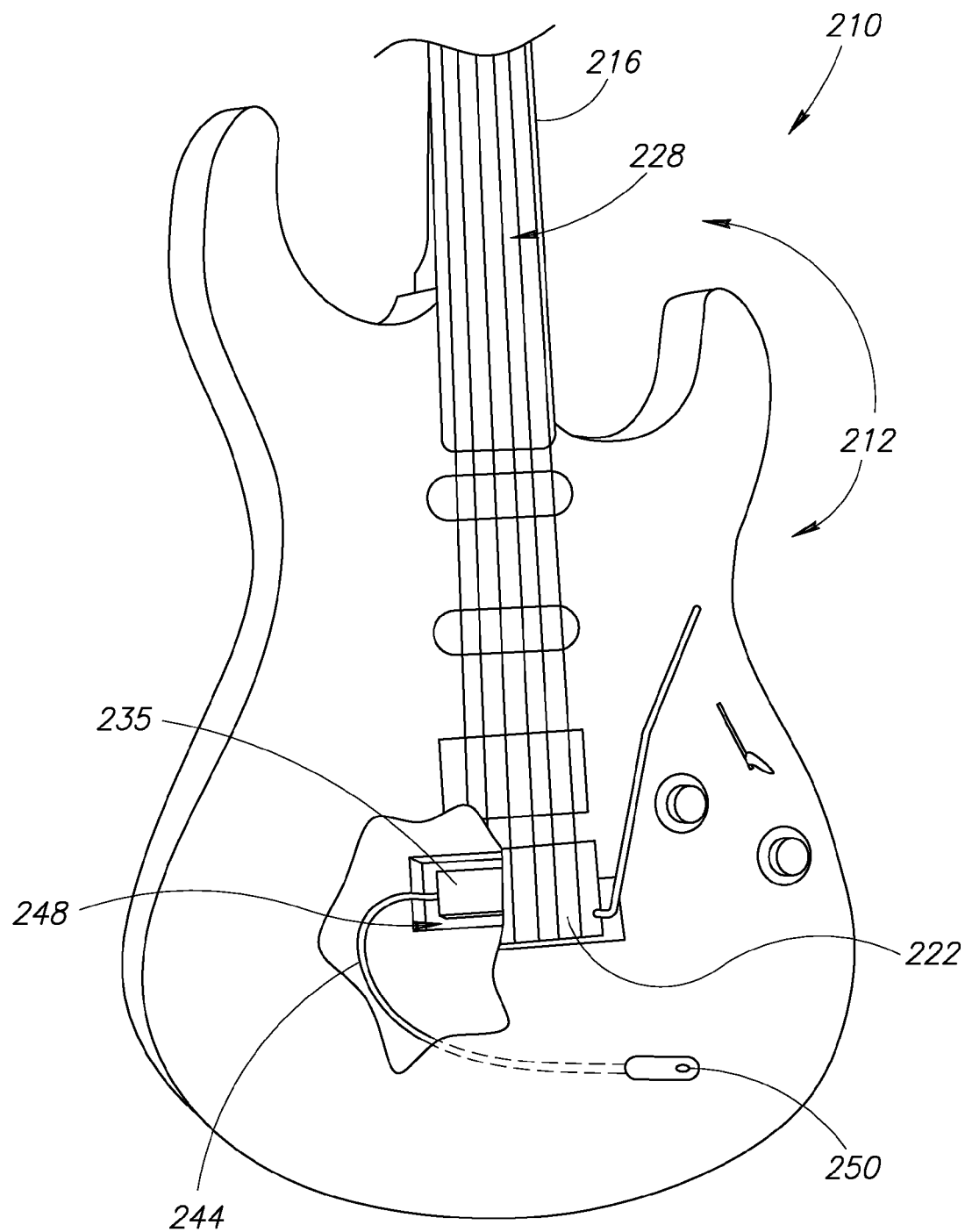
FIG. 3A is a perspective view of an electric guitar having a location transmitting device and an electric power source according to one aspect of the present disclosure.

FIG. 3A shows a musical instrument 210 according to one aspect of the present disclosure. In this example, the musical instrument is an electric guitar 210. The guitar 210 includes a plurality of musical components, such as a body 212 having a neck 216, strings 228, and a pickup 222 covering a cavity 248 in the body 212. As with many electric and hybrid-electric guitars, the pickup 222 is secured to the strings 228 and removably fastened to the body 212 with a plurality of fasteners. The pickup is the component that senses the vibration of the strings and sends a signal to the amplifier to output the sound. As shown by the cutaway of the guitar 210, a transmitter housing 235 is permanently installed inside the cavity 248 of the guitar 210. The transmitter housing 235 may include the features of FIG. 1B. For example, FIG. 1B illustrates that the transmitter housing 235 of the guitar 210 of FIG. 3A may include a location transmitting device 36 and an electric power source 38 electrically coupled to each other. The location transmitting device 36 may include a location sensing unit 40 and a wireless transmitter 42 electrically coupled to each other. The location sensing unit 40 is capable of sensing a location of the guitar 210 and communicating such location to the wireless transmitter 42 to wirelessly output a location of the guitar 210 in the event the musical instrument is lost or stolen, for example. The features of FIG. 2B may also be combinable with the transmitter housing 235 of the guitar 210 of FIG. 3A.

Accordingly, the transmitter housing 235 is positioned underneath and adjacent the pickup 222 in a position that requires removal of at least the strings 228 and pickup 222 and in order to remove or tamper with the location transmitting device 235.

In some aspects, the guitar 210 includes a power supply line 244 electrically coupled to the transmitter housing 235 and to an output jack 250 of the electric guitar. In this manner, electric power may be supplied to the electrical power supply in the transmitter housing 235 when an input line is coupled to the output jack 250, for example. In some aspects, the transmitter housing 235 is positioned in the guitar 210 in a position that does not noticeably interfere with the acoustic and electric properties of the guitar 210, such as below the pickup 222 or in a formed cavity in another portion of the guitar 210, for example.

Figure 3B:
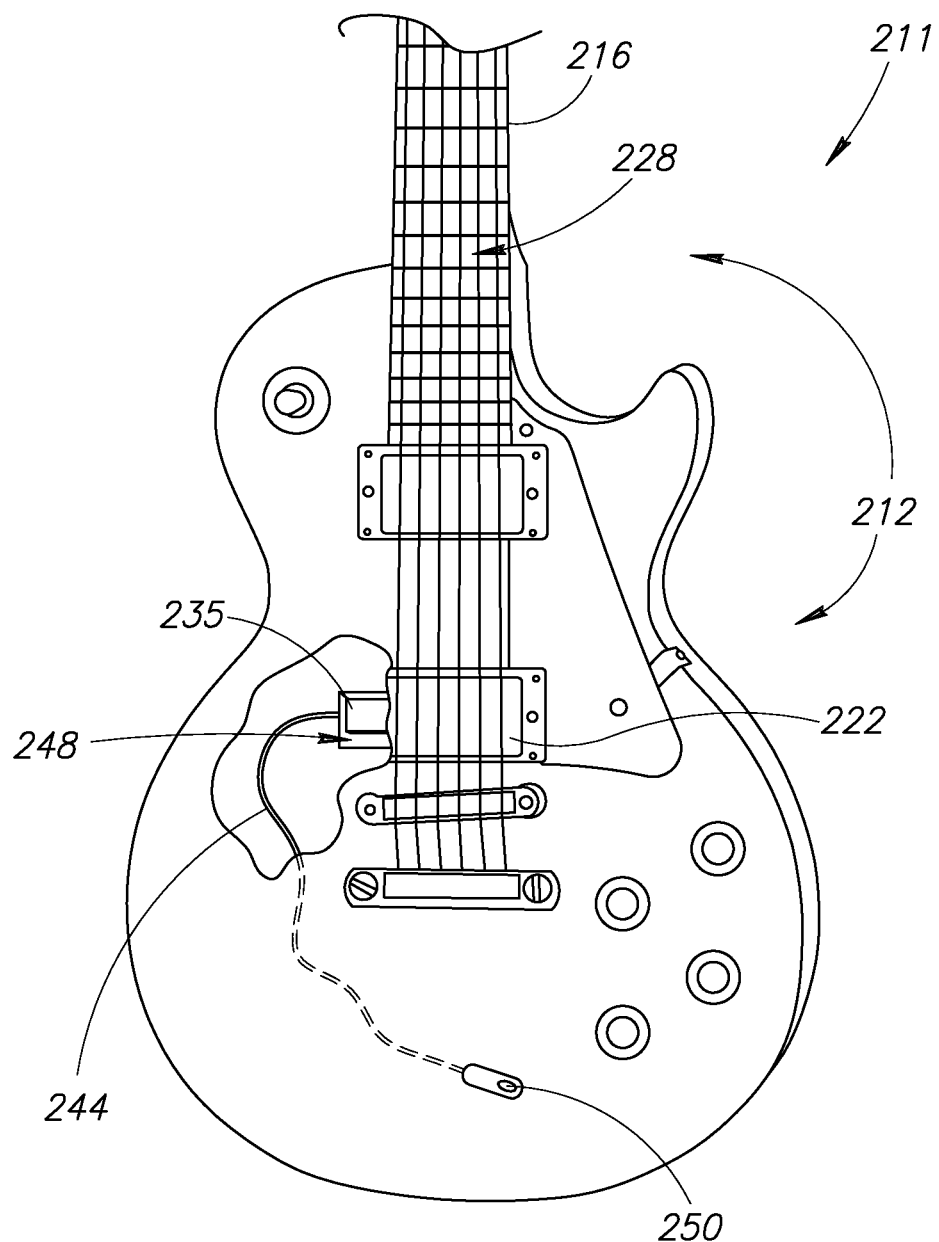
FIG. 3B is a perspective view of an electric guitar having a location transmitting device and an electric power source according to one aspect of the present disclosure.

FIG. 3B shows a musical instrument 211 according to another aspect. In this example, a well-known Les Paul design guitar 211 is provided having the same or similar features with respect to the description of FIG. 3A, as indicated by the same reference numerals of FIG. 3A. The guitar 211 may be combinable with features described with reference to FIGS. 1, 2, and 4. As shown by the cutaway of the guitar 211, a transmitter housing 235 is permanently installed inside a cavity 248 underneath a pickup 222 of the guitar 211. The transmitter housing 235 may include the features of FIG. 1B. Accordingly, the transmitter housing 235 is in a position that requires removal of at least the strings 228 and pickup 222 and in order to remove or tamper with the location transmitting device 235.

Figure 4:
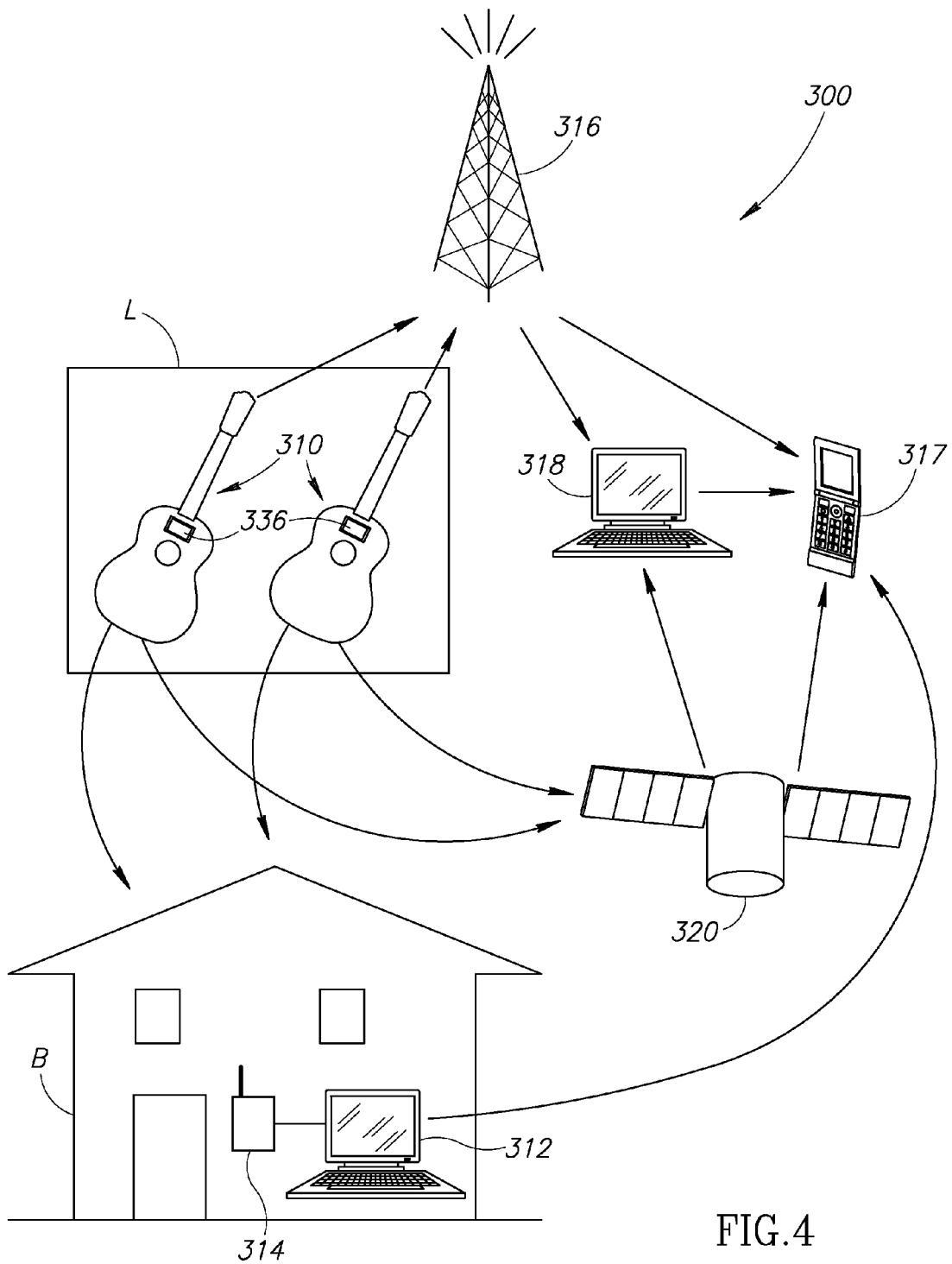
FIG. 4 is a graphical representation of a communication system of a plurality of guitars each having a location transmitting device and an electric power source according to one aspect of the present disclosure.

FIG. 4 is a musical instrument monitoring system 300 according to one aspect of the present disclosure. The system 300 includes a plurality of guitars 310 in proximity to each other at a location L. Each guitar 310 includes a location transmitting device 336 permanently secured inside the guitar 310 in a position that requires removal of a musical component of the guitar in order to remove the location transmitting device, such as described with reference to FIGS. 1A-3B. Each location transmitting device 336 may include a location sensing unit and a wireless transmitter, such as described with reference to FIGS. 1A-3B.

The system 300 may include a computing system 312 in proximity to the location L. The computing system 312 may be capable of receiving and transmitting information obtained from the transmitter of one or more of the location transmitting devices 336 in the plurality of guitars 310. Based on such information, the computing system 312 may determine and monitor the location of one or more of the guitars 310.

In some aspects, the location L is inside or near a building B, for example. The computing system 312 may be coupled to a wireless router 314 inside the building B. The wireless router 314 may be capable of receiving information from the location transmitting devices 336 for transmittal of such information to the computing system 312. Accordingly, the wireless router 314 may be constantly or intermittently determining and monitoring the location of the guitars 310 such that if one or more guitars 310 are removed from building B, the wireless router 314 transmits a signal to the computing system 312. In some aspects, the computing system 312 is in wireless communication with a mobile device 317 to alert the owner of a location of the guitars 310, for example. In some aspects, the wireless router 314 detects other information pertaining to the guitars 310, such as a state of charge of the electric power source to alert the owner when power levels are low, for example.

In some aspects, the system 300 includes a means for wireless communication between the guitars 310 and other systems. For example, the location transmitting devices 336 may be capable of outputting a signal to a transmission tower 316, for example. The tower 316 may be a cellular tower that transmits the signal to the mobile device 317 and/or to a computing system 318. The computing system 318 may transmit the information to the mobile device 317. As another example, the location transmitting devices 336 may be capable of outputting a signal having information to a satellite 320, for example. The satellite 320 may be in space and may transmit the information to the mobile device 317 and/or to the computing system 318, for example.

In some aspects, the information transmitted through the system 300 comprises at least one of a location of the guitar(s), a state of charge of the energy power source in the guitars, a proximity of the guitar(s) relative to the location L and/or the building B, and data pertaining to a type of guitar(s) that may have been removed from the location L and/or the building B.

Thus, when one or more guitars 310 are removed from the location L and/or the building B, the owner (or other person) can immediately receive an alert on the computing system 312 and/or the mobile device 317 that one or more guitars 310 have been stolen, for example.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A musical instrument comprising:
a body having a cavity and a neck;
an electric power source mounted in the body; and
an anti-theft feature that includes a location transmitting device permanently secured to the body and coupled to the electric power source, the location transmitting device having a location sensing unit and having at least one wireless transmitter that, in response to a change in location of the musical instrument being sensed by the location sensing unit, transmits a signal indicating a new location of the musical instrument, the location transmitting device permanently secured in the body in a position that requires removal of a musical component of the musical instrument in order to remove the location transmitting device.

2. The musical instrument of claim 1, wherein the location transmitting device is positioned at least partially in the cavity of the body such that a space consumed by the location transmitting device does not noticeably interfere with acoustic properties of the musical instrument.

3. The musical instrument of claim 1, wherein the musical instrument is a guitar.

4. The musical instrument of claim 3, wherein the location transmitting device is secured to a proximal end of the neck of the guitar, the proximal end extending partially within the cavity.

5. The musical instrument of claim 3, wherein the location transmitting device is permanently secured inside of the neck of the guitar.

6. The musical instrument of claim 1, further comprising a power supply line and a power supply port coupled to each other, the power supply line coupled to the electric power source, the power supply port coupled to an exterior portion of the musical instrument and to the power supply line to electrically charge the electric power source.

7. The musical instrument of claim 1, wherein the musical instrument is an electric guitar having a pickup.

8. The musical instrument of claim 7, wherein the cavity is positioned underneath the pickup of the electric guitar and the location transmitting device is permanently secured in the cavity and adjacent the pickup in a position that requires removal of the pickup in order to remove the location transmitting device.

9. The musical instrument of claim 7 wherein the electric power source is electrically coupled to an output jack of the electric guitar in order to power the electric power source when an input line is coupled to the output jack.

10. The musical instrument of claim 1, wherein the at least one wireless transmitter is configured to transmit a signal to at least one of a mobile device, computing system, satellite, communication tower, or wireless router to provide information to a user.

11. The musical instrument of claim 10, wherein the information comprises at least one of a location of the musical instrument, a state of charge of the location transmitting device, a proximity of the musical instrument relative to the location, and data pertaining to a type of musical instrument.

12. The musical instrument of claim 1 wherein the location transmitting device is concealed inside the musical instrument and the wireless transmitter periodically transmits a signal indicating the location of the musical instrument even if the location of the musical instrument does not change substantially.

13. A system for monitoring musical instruments, comprising:
a plurality of musical instruments in proximity to each other at a location, each musical instrument having a body having a cavity and a neck, and an electric power source mounted in the body, each musical instrument equipped with an anti-theft feature that includes a location transmitting device permanently secured to the body and coupled to the electric power source, the location transmitting device having a location sensing unit and having at least one wireless transmitter that, in response to a change in location of the musical instrument being sensed by the location sensing unit, outputs information pertaining to the musical instruments, the location transmitting device permanently secured in the body in a position that requires removal of a musical component of the musical instruments in order to remove the location transmitting device; and
a computing system in proximity to the location and the plurality of musical instruments, the computing system programmed to receive and transmit information obtained from the at least one wireless transmitter of each of the plurality of musical instruments to determine the location of at least one of the plurality of musical instruments.

14. The system of claim 13, wherein the location transmitting device and the electric power source are positioned in the body in a position that does not noticeably interfere with acoustic properties of the musical instrument.

15. The system of claim 13, wherein each musical instrument is one of an acoustic guitar, an electric guitar, a hybrid guitar, and a string musical instrument.

16. The system of claim 13, wherein the computing system and the location transmitting device of each musical instrument cooperate to transmit a signal to at least one of a mobile device, a satellite, and a wireless communication tower to provide information to a user.

17. The system of claim 13, wherein the information comprises at least one of a location of the musical instrument, state of charge of the location transmitting device, proximity of the musical instrument relative to the location, and data pertaining to a type of musical instrument.

18. A method of making a musical instrument comprising:
forming a portion of the musical instrument having an open body having a cavity and a neck;
coupling an electric power source to the open body;
coupling to the electric power source an anti-theft feature that includes a location transmitting device and permanently installing the location transmitting device in the open body, the location transmitting device having a location sensing unit and having at least one wireless transmitter that transmits a signal indicating a new location of the musical instrument in response to a change in location of the musical instrument being sensed by the location sensing unit; and
closing the open body to form a closed cavity, the location transmitting device permanently secured in the closed cavity in a position that requires removal of a musical component of the musical instrument in order to remove the location transmitting device.

19. The method of claim 18, further comprising installing a power supply line and a power supply port before closing the open body, the power supply line coupled to the power supply port, the power supply port coupled to an exterior portion of the musical instrument to electrically charge the electric power source via the power supply line when an external power source is coupled to the power supply port.

20. The method of claim 18, wherein installing the location transmitting device comprises securing the location transmitting device in the cavity of one of an acoustic guitar, an electric guitar, a hybrid guitar, and a string musical instrument.

* * * * *